United States Patent [19]

Maranci

[11] Patent Number: 4,737,527

[45] Date of Patent: Apr. 12, 1988

[54] FIBER REINFORCED THERMOSETTING RESIN COMPOSITIONS WITH COATED FIBERS FOR IMPROVED TOUGHNESS

[75] Inventor: Arutun Maranci, Westport, Conn.

[73] Assignee: American Cyanamid Company, Stamford, Conn.

[21] Appl. No.: 602,996

[22] Filed: Apr. 23, 1984

[51] Int. Cl.⁴ ................................................ C08K 9/04
[52] U.S. Cl. .................................... 523/205; 523/209; 523/445; 523/448; 523/457; 523/468; 525/113; 525/122
[58] Field of Search ............... 523/205, 468, 448, 209; 525/113, 122

[56] References Cited

U.S. PATENT DOCUMENTS

| | | | |
|---|---|---|---|
| 3,728,146 | 4/1973 | Marzocchi | 523/205 |
| 3,806,489 | 4/1974 | Rieux et al. | 523/468 |
| 4,405,727 | 9/1983 | Brownscombe | 523/205 |
| 4,425,384 | 1/1984 | Brownscombe | 523/205 |
| 4,440,881 | 4/1984 | Girgis | 523/206 |
| 4,443,566 | 4/1984 | Ying | 523/205 |
| 4,446,255 | 5/1984 | Ying et al. | 523/205 |

FOREIGN PATENT DOCUMENTS

| | | | |
|---|---|---|---|
| 0045949 | 2/1982 | European Pat. Off. | 523/205 |
| 736981 | 1/1970 | France | 523/205 |
| 5274655 | 12/1975 | Japan | 523/468 |

*Primary Examiner*—Lewis T. Jacobs
*Attorney, Agent, or Firm*—Michael J. Kelly; William H. Calnan; Roger S. Benjamin

[57] ABSTRACT

Heat curable compositions of reinforcing fibers (filaments), a thermosetting prepolymer or prepolymers and an effective amount of a curing agent or agents in which the fibers have been precoated with a fiber- and matrix resin-reactive elastomer are described. The compositions are useful to form composites of high fracture toughness and compressive strength which, in turn, can be formed into structural members such as aircraft parts. Processes for applying an elastomer coating to fiber tapes, fabrics and rovings are also described.

32 Claims, 3 Drawing Sheets

FIBER REINFORCED THERMOSETTING RESIN COMPOSITIONS WITH COATED FIBERS FOR IMPROVED TOUGHNESS

FIELD OF INVENTION

This invention relates to improved fiber reinforced thermosetting resin compositions and, more particularly, to heat curable compositions comprising a resin matrix in which are dispersed elastomer coated reinforcing filaments (fibers), the elastomeric coating being reactive with both the filament surface and the adjoining or adjacent matrix resin. The invention also concerns articles prepared from such compositions, as well as processes of manufacture for elastomer-coated fiber tapes, fabrics and rovings.

BACKGROUND OF THE INVENTION

Thermosettable resins, for example, epoxies, are known to be useful in conjunction with fibrous reinforcing materials to form composite articles characterized by high strength to weight ratios. Such articles have found wide use in the aircraft and aerospace industries, as well as in other commercial applications where attributes such as strength, corrosion resistance and light weight are desirable. Fiber-resin materials have also been employed successfully in sporting equipment, such as tennis rackets and golf clubs.

Descriptions of various fiber-resin compositions are found in the patent literature. For instance, Frigstad in U.S. Pat. No. 3,472,730 shows filament-reinforced sheeting comprised of a heat curable epoxy resin composition. Russell in U.S. Pat. No. 4,178,406 describes fiberglass-reinforced composite articles of a cured binder resin and a method for their production. Fiber-reinforced epoxy resin articles useful as plastic piping material are disclosed by Johnson, et al. in U.S. Pat. No. 4,343,843. Prepregs comprised of a heat curable epoxy resin and reinforcing fibers, e.g., carbon, glass, aromatic polyamides, are described in U.S. Pat. No 4,309,473 (Minamisawa, et al.).

To improve the toughhess of fiber-resin matrix composites, it has heretofore been proposed to provide the fibers with a coating of elastomeric material. In one procedure, described in German Offen. No. 2,326,035, carbon fiber-epoxy resin composites are prepared by coating the fiber with an elastomeric polyester epoxide, e.g., adipic acid-bisphenol-A-diepoxide-butanediol copolymer, followed by embedding in an epoxide resin matrix. This procedure provides a plasticized epoxy coating on the fiber which is compatible with the matrix resin and can migrate away from the interface during the curing of the composite.

Tryson and Kardos describe a matrix compatible plasticized epoxy composition using Versamid-140 (General Mills) with glass monofilaments and rovings (36th Annual Conf. Reinforced Plastics/Composites Institute, The Society of the Plastics Industry, Inc., Feb. 16–20, 1981). Ying describes a non-reactive silicone rubber coating and an impact modified epoxy compatible finish (S.A.M.P.E. Quarterly, April 1983, pp. 26–32). The first material provides improvement in impact resistance but poor composite properties. The second material, being compatible with epoxy matrix resin, is expected to diffuse away from the fiber-matrix interface.

Enever, U.S. Pat. No. 3,943,090 (See also U.K. Pat. No. 1,358,276) describes a method of forming a composite of carbon fibers and synthetic plastics by incorporating the fibers in a matrix of the plastic. An elastomeric material, such as a urethane rubber, is provided in the matrix resin or, by surface treatment, on the fibers themselves to minimize the tendency for cracks to initiate at the fiber-resin matrix interface. The rubber is described as being compatible with the matrix resin, that is, it tends to move from the fiber surface into the resin matrix.

Thus, in all of the examples cited, either a compatible or a non-reactive coating is used. In the first case, the coating, being compatible with the matrix resin, is removed from the fiber interface by dissolution. In the second case, the coating creates a poorly bonded, weak interface which sacrifices internal strength properties.

Subramanious et al (Poly. Eng. Sci., Vol. 18, No. 7, 1978) have used electropolymerization and electrodeposition techniques to coat carbon fibers with polar and water soluble polymers. However, the resulting interface is susceptible to moisture intrusion and, therefore, it is expected—and as the work of Kaelble (J. Adhesion 8, 121 (1976) shows—that hot-wet properties of the composite are very poor.

Gynn et al (AFWAL-TR-81-4076) used polymers such as employed by Subramanious, for example, styrene/maleic anhydride, and later imidized the coating to render it hydrophobic. The coating in this case was a rigid layer, and no improvement in the impact strength of the composites was observed.

In the context of another kind of use, carbon fibers are described in Japan 75/58,396 as being impregnated with a rubber latex or liquid rubber, e.g., nitrile rubber, for improved performance in textile fabrics. Brook in U.S. Pat. No. 4,264,655, on the other hand, describes rovings such as fibrous strands, yarns, threads and tapes impregnated with a thermosetting resin such as an epoxy alone or in admixture with a reactive elastomer, e.g., carboxy-modified acrylonitrilebutadiene rubber, then overcoated with a nylon resin or other thermoplastic. In this case, all of the matrix resin, alone or plasticized with rubber, is applied to the fibers and then overcoated, e.g., with nylon; the overcoating is said to provide improved properties for textile operations.

OBJECTS OF THE INVENTION

It is an object of this invention to provide fiber (filament) reinforced heat curable resin compositions having improved toughness in comparison with conventional fiber reinforced resin compositions, after curing.

It is another object of this invention to provide heat curable fiber-resin matrix compositions in which the fibers have been pre-coated with an elastomeric material that chemically reacts with the fiber surface such that the elastomer coating is chemically bonded and resists migration away from the fiber into the resin matrix.

A further object of this invention is to react the immobilized elastomeric coating with the matrix resin to produce a bridging layer covalently bonded both to the fiber and the resin matrix to provide good impact strength, interlaminar shear strength, fracture resistance and hot-wet properties.

Another object of this invention is to provide processes in which a fiber- and resin matrix-reactive elastomer is applied to a fiber, tape, fabric or roving.

It is still another object of this invention to obtain structural members, such as aircraft parts, formed by stacking and curing a number of the fiber-resin matrix composites.

SUMMARY OF THE INVENTION

The above mentioned objectives, as well as others which will be apparent from the following description, are accomplished by providing in one aspect in accordance with this invention a composition comprising:

(a) reinforcing fibers having a coating of a fiber- and matrix resin-reactive elastomeric material that resists movement away from the fiber surface, and forming a covalently bonded bridging layer between the fibers and the matrix resin; and (b) a heat-curable epoxy resin composition comprising (i) a prepolymer or combination of prepolymers having more than one functional group per molecule, and (ii) an effective amount of a curing agent or agents.

By the term "reactive", it is meant that the elastomeric coating material is capable of and actually does undergo covalent chemical bonding with the reinforcing fiber surface, as well as with the adjacent functional groups of the resin matrix, such that movement, e.g., migration, from the fiber-matrix resin interface during curing is substantially avoided.

The use of an elastomeric coating on the fiber (filament) surface in accordance with this invention results in improvements in the fracture resistance, in comparison with compositions and composite articles in which the fibers are not so coated. Moreover, this is accomplished while maintaining the hot-wet properties.

Other facets of the invention comprise composite articles formed from the above mentioned compositions, structural members prepared from the composites, and processes for applying reactive elastomeric coatings to fibers, fiber tapes, fabrics and rovings.

The invention can be practiced with use of a wide variety of thermosetting resins, including polyimides, bismaleimides, allyl phthalates, furanes, melamine-formaldehydes, phenol-formaldehydes, phenol-furfurals, polyacrylic esters, silicones, urea formaldehydes, epoxy resins, allylic resins, glyceryl phthalates, and polyesters. Especially preferred are epoxy resins.

The terms "fiber" and "filament" are used throughout this disclosure interchangeably.

DETAILED DESCRIPTION OF THE INVENTION

Figure 1:
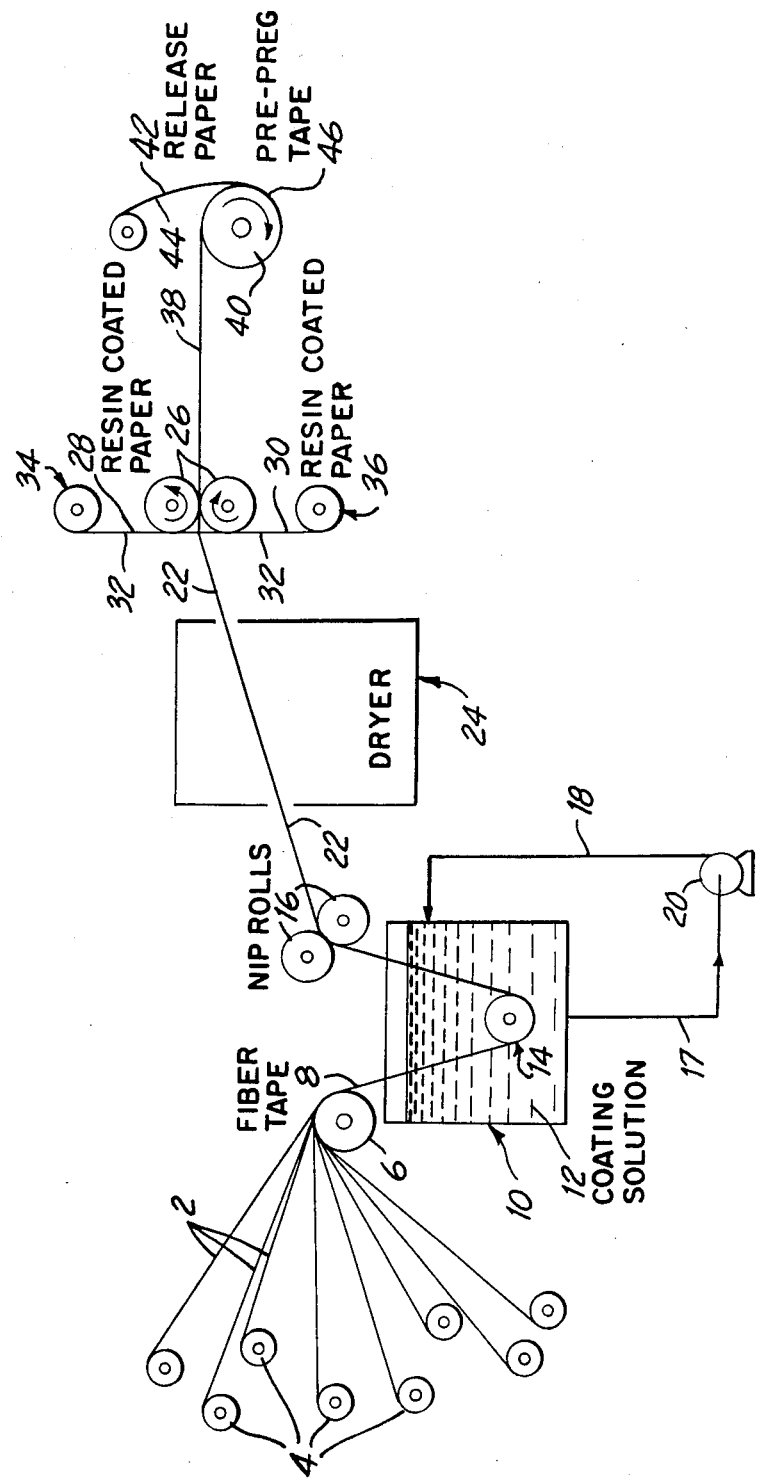
FIG. 1 is a schematic drawing of a method for preparing a fiber-resin matrix prepreg tape of the present invention.

The fiber-resin matrix compositions of this invention can be prepared by embedding filaments, for example, elastomer coated glass fibers and/or elastomer coated non-siliceous filaments, in a heat curable resin composition to form a fiber-resin matrix composite which can be cured to a solid article. Particular selection of the filament (fiber) material, matrix resin and curing agent, as well as any optional ingredients that may be present, provides a range of curable compositions characterized by good physical properties, including certain properties mentioned above that are superior to those of the corresponding compositions in which the fibers are not elastomer-coated.

Glass filaments useful herein are well known. The non-siliceous filament component may be of any non-glass, non-silicon dioxide-containing material which improves the strength or other physical properties of the curable epoxy or other resin component. Such filaments include, but are not limited to, filaments comprised of carbon, graphite, silicon carbide, boron, aramid, polyester, polyamide, rayon, polybenzimidazole, polybenzothiazole, metal-coated such filaments, for example, nickel-coated and/or silver-coated graphite fibers and filaments, or combinations of such filaments. Fibers (woven or non-woven), tows or mats of such filaments, or tapes may be employed as desired. In applications demanding high stiffness to weight ratio or shear strength, carbon fibers, graphite filaments, polyaramide filaments or nickel-plated graphite filaments are most preferred.

Prior to use in this invention, and prior to application of the elastomer coating, the filaments may be sized. The term "sized" is used here in the conventional sense to refer to the surface treatment of the fiber of filament with a substance, i.e., sizing agent, that facilitates the blending of the fiber or filament in a matrix of organic polymeric material. Such sizing agents are well known to those skilled in the art and include, for instance, aminosilanes in the case of metal or metal-coated fibers and epoxy compounds in the case of non-siliceous fibers. The sizing treatment may be carried out in a conventional manner, but for the most part fibers are available from the manufacturers in sized versions.

If desired, however, fibers that are not sized can be used. Such fibers can be treated to improve the adhesion of the elastomer to be applied by impregnating the fibers with a mixture of the matrix resin, which contains one or more functional groups, and the elastomer.

The elastomeric coating materials for the reinforcing filaments are preferably rubbery vinyl addition polymers, including homopolymeric and copolymeric diene rubbers derived form conjugated dienes of from 4 to 8 carbon atoms, such as butadiene, isoprene, propylene, chloroprene, and the like. These include but are not limited to copolymers of such dienes with each other and with one or more of such monomers as styrene, acrylonitrile, methacrylonitrile, acrylic acid, methacrylic acid, methyl methacrylate, and the like. Carboxylic-functional butadiene-acrylonitrile copolymers are most preferred.

The coating material can be in the form of a solid or a liquid under normal conditions of room temperature.

It is among the preferred features of this invention, and especially if a liquid rubber is employed, to include with the coating material a resin capable of covalent bonding with the rubber. An example is an epoxy polymer of prepolymer. Practice has shown that the presence of the resin serves to enhance the adhesion of the elastomer coating to the fiber surface, thus increasing the resistance against migration into the resin matrix during subsequent heat curing.

The amount of the resin used varies generally from about 10 to about 200 percent by weight, based on the amount of rubber coating material.

Application of the elastomer coating material to the fiber surface may be accomplished in any convenient manner. In one way, which is preferred, the rubber is dissolved in a solvent, optionally with a covalently bondable resin, e.g., epoxy, and long continuous strands of the fiber or fiber tapes are passed through the rubber solution, then dried to remove the solvent, leaving a residual layer of covalently bonded rubber on the individual fiber surfaces. By way of illustration, an elastomeric coating of from 0.05 to 0.5 micron thickness on each fiber is applied, which can be regulated by conditions such as the concentration of rubber in the coating solution, the rate of passage of the fiber strands through the solution, and other factors which will be apparent to those skilled in the art. The drying procedure is preferably carried out at temperatures of from about 50° to about 150° C. for 2 to 15 minutes, to achieve best results. Drying also facilitates crosslinking between the rubber coating and the fiber surface, thus bonding the coating to the fiber.

The solvent for the coating solution should desirably be relatively low boiling (to facilitate subsequent volatilization upon drying), e.g., less than 100° C. Other advantageous characteristics include non-flammability, non-explosiveness upon admixture with air, and little or no photochemical activity, all of which are especially suitable for health and environmental reasons. Especially preferred is methylene chloride and its chemical equivalents, alone or in admixture with small amounts of tetrahydrofuran.

If desired, the rubber coating may be applied on the fiber surface in the form of a latex, followed by drying.

As mentioned, the preferred polymer, or prepolymer, for the matrix resin portion of the composition is an epoxy resin or resins. Especially preferred epoxies are those having more than one functional group in the molecule. Component (b) of the present compositions is prepared by mixing a polyfunctional epoxide compound or compounds (prepolymer or prepolymers) with a suitable curing agent, such as an amine-functional, and preferably polyfunctional curing agent. Conventional ratios can be used, for example, 1 epoxide equivalent to 0.3 to 3.0 NH-equivalents, preferable 1.0 to 3.0 NH-equivalents, and especially preferably 1.5 to 2.5 HN-equivalents, optionally with heating.

The epoxy prepolymers include, but are not limited to, polyglycidyl ethers of polyvalent phenols, for example, pyrocathechol; resorcinol; hydroquinone; 4,4'-dihydroxy-3,3'-dimethyldiphenyl methane; 4,4'-dihydroxydiphenyl dimethyl methane; 4,4'-dihydroxydiphenyl methyl methane; 4,4'-dihydroxydiphenyl cyclohexane; 4,4'-dihydroxy-3,3'-dimethyldiphenyl propane; 4,4'-dihydroxydiphenyl sulphone; or tris-(4-hydroxyphenyl)methane; polyglycidyl ethers of the chlorination and bromination products of the above-mentioned diphenols; polyglycidyl ethers of novolacs (i.e., reaction products of monohydric or polyhydric phenols with aldehydes, formaldehyde in particular, in the presence of acid catalysts); polyglycidyl ethers of diphenols obtained by esterifying 2 mols of the sodium salt of an aromatic hydroxycarboxylic acid with 1 mol of a dihalogen alkane or dihalogen dialkyl ether (See U.K. Pat. No. 1,107,612); and polyglycidyl ethers of polyphenols obtained by condensing phenols and long-chain halogen paraffins containing at least 2 halogen atoms (See U.K. Pat. No. 1,024,288).

Other suitable compounds include polyepoxy compounds based on aromatic amines and epichlorohydrin, for example, N,N'-diglycidyl-aniline; N,N'-dimethyl-N,N'-diglycidyl-4,4'-diaminodiphenyl methane; N,N,N',N'-tetraglycidyl-4,4-diaminodiphenyl methane; and N-diglycidyl-4-aminophenyl glycidyl ether. Special mention is made of N,N,N',N'-tetraglycidyl-1,3-propylene bis-4-aminobenzoate.

Glycidyl esters and/or epoxycyclohexyl esters of aromatic, aliphatic and cycloaliphatic polycarboxylic acids, for example, phthalic acid diglycidyl ester and adipic ester diglydicyl and glydicyl esters of reaction products of 1 mol of an aromatic or cycloaliphatic dicarboxylic acid anhydride and ½ mol of a diol or 1/n mol of a polyol with n hydroxyl groups, or hexahydrophthalic acid diglycidyl esters, optionally substituted by methyl groups, are also suitable.

Glycidyl ethers of polyhydric alcohols, for example, of 1,4-butanediol; 1,4-butenediol; glycerol; 1,1,1-trimethylol propane; pentaerythritol and polyethylene glycols may also be used. Triglycidyl isocyanurate; and polyglycidyl thioethers of polyvalent thiols, for example of bis mercaptomethylbenzene; and diglycidyltrimethylene sulphone, are also suitable.

Preferably, the epoxy prepolymer will be selected from compounds having the formula:

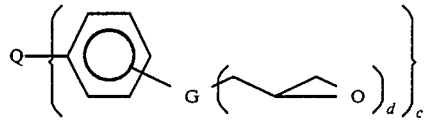

and halogen and alkyl substituted derivatives of such compounds, wherein c is 2, 3 or 4 and equal to the valence of Q; Q is a divalent, trivalent or tetravalent radical; G is —O—, NR'— or —N—; R is hydrogen or alkyl; and d is 1 or 2 depending on the valence of G.

The most preferred epoxy compounds will include the following:

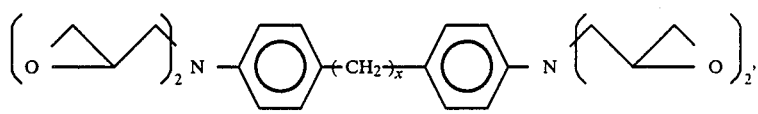

wherein x is an integer from 1 to 4, available commercially (where x=1) as Araldite®MY-720 (Ciba-Geigy);

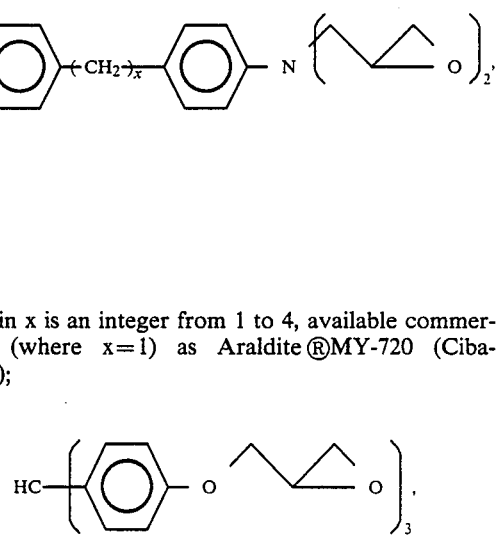

available commercially as XD7342 (Dow Chemical);

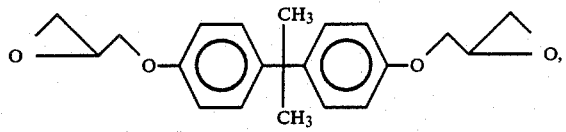

available commercially as DER 331 (Dow Chemical) or EPON® 828 (Shell);

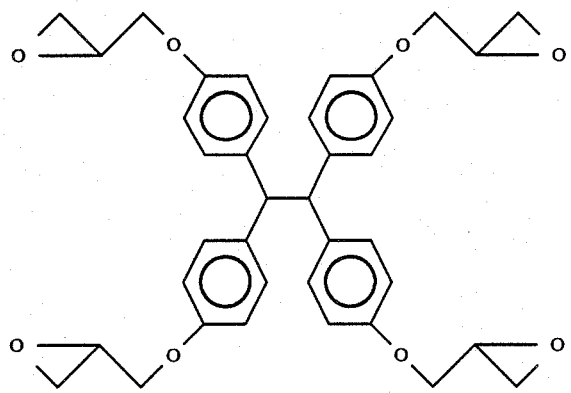

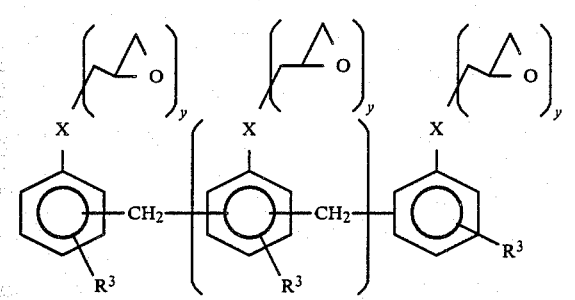

wherein Y is 1 or 2, X is —O— or —N—, $R^3$ is H or $CH_3$ and n is 2 to 8.

Compounds in which X is —O— are available as a mixture under the tradename DEN-438 from Dow Chemical Company.

Also preferred are triglycidyl ethers of meta-and para-hydroxyaniline, for example, those represented by the formula;

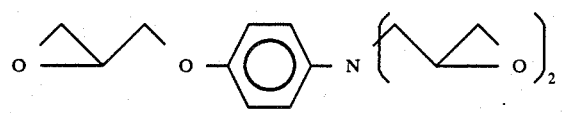

These are available under the tradename ARALDITE® 0500, 0510 from Ciba-Geigy.

The amine-functional curing agents, component (b) (ii), are polyfunctional amines, the preferred members of which have the formula:

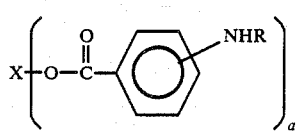

wherein a is 2 or 3, R is hydrogen, alkyl or aryl, and X is a divalent or trivalent organic hydrocarbon, hetero-interrupted hydrocarbon, or substituted hydrocarbon radical or —N—. They may be prepared from corresponding starting materials, e.g., nitro compounds, by reduction, for example, according to methods described in U.K. Pat. No. 1,182,377. In addition, commonly assigned U.S. application Ser. No. 518,863, filed Aug. 1, 1983, now U.S. Pat. No. 4,623,746, shows an elegant method for N-methylation, using succinimide and formaldehyde with the primary amine, followed by reductive cleavage.

Preferred curing agenst are compounds according to the above formula in which R is hydrogen, $C_1$-$C_3$ alkyl, or phenyl and X is a divalent or trivalent radical of valence a, selected either from (1) a divalent group consisting of —$(CH_2)_y$—, wherein y is an integer of from 2 to 12, —($CH_2CH_2OCH_2CH_2OCH_2CH_2$)—,

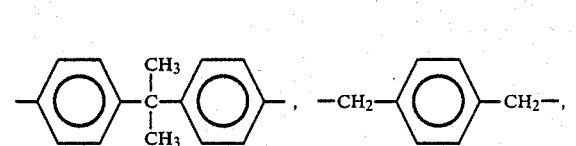

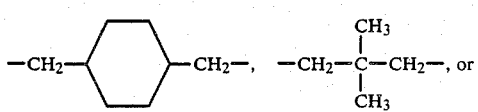

(2) A trivalent group consisting of —N— and

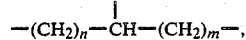

wherein n and me are the same of different integers from 1 to 4.

More preferred curing agents are the following:

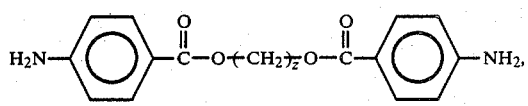

wherein z is an integer of from 2 to 12, preferably 2 to 6,

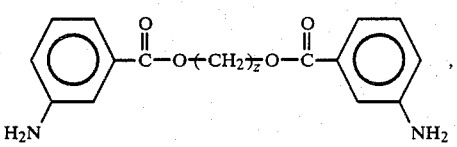

wherein z is an integer from 2 to 12, preferably 2 to 6,

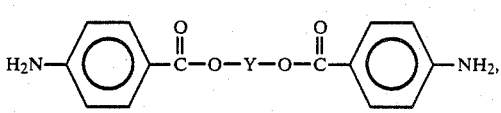

wherein Y is —$CH_2CH_2OCH_2CH_2OCH_2CH_2$—,

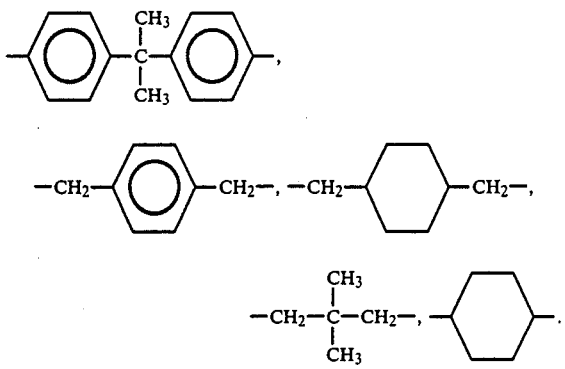

In the most preferred compounds, the primary diamine will include one or more of a compound of the formula:

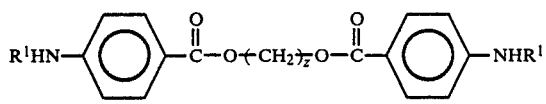

wherein $R^1$ is hydrogen and z is an integer of from 2 to 12, preferably 2 to 6, and most preferably 3. Also contemplated are the use of such compounds in combination with other conventional polyamines such as methylene dianiline, phenylene diamine, and the like.

Fillers, coloring agents (e.g., dyes pigments), plasticizers, catalysts or accelerators for the curing agent, and other such conventional additives and processing aids may be added to the fiber-matrix resin compositions of the invention before curing to influence the properties of the final composite. Special mention is made of curing catalysts, examples of which are boron trifluoride-amine reaction products and toluenediisocyanate-dimethylamine reaction products; and of fillers, such as fumed silica. The curing catalysts, in particular, are added in quantities effective to accelerate curing, for example, 0.1 to 5% by weight, based on the combined weights of the matrix resin and curing agent.

DETAILED DESCRIPTION OF THE DRAWINGS

One method of forming a fiber-matrix composite in accordance with the invention is illustrated in the drawings. As shown in FIG. 1, a tape of elastomer-coated fibers is produced by delivering fiber tows 2 from spools over tape roller 6, where fiber tape 8 is formed, into open topped vessel 10 containing elastomer solution 12, around roller 14 and through nip roller assembly 16. The feed of fiber tows 2 to tape roller 6 is preferably selected to deliver the fibers from 100 spools in a paralled array, within a 12 inch width. Elastomer solution 12 is circulated at a constant level through vessel 10 by means of conduits 17 and 18 and circulation pump 20.

Elastomer-coated fiber tape 22 emerges from nip roller assembly 16 and is delivered to oven dryer 24, where, for example, it is dried for 3 to 8 minutes at about 100° C.

Elastomer-coated fiber tape 22 is delivered from oven dryer 24 to pressure roller assembly 26. Resin coated papers 28 and 30, coated with matrix resin 32, are fed from rollers 34 and 36, respectively, through pressure roller assembly 26 simultaneously with fiber tape 22; on both flat sides, such that fiber-matrix resin composite 38 is produced.

The pressure rollers 26 are set at a temperature and pressure for embedding fiber tape 22 in resin layer 32 to form fiber-resin composite 38. Experience has shown that a temperature of about 100° C. and pressures of 50 to 100 psi applied on pressure rollers are suitable for preparing the composite.

Fiber tape 22 and papers 28 and 30 with matrix resin 32 are sent to pressure rollers 26 and passed through at a rate of 1 to 10 feet per minute.

The feed of fiber tape 22 and resin layer 32 to pressure rollers 26 is preferably selected to achieve a fiber-matrix of about 25 to 50 weight percent of resin and about 50 to 75 weight percent of fiber. For example, a tape comprised of 100 tows, each having 6000 fibers within a 12 inch width, is sent to pressure rollers 26 with layer of resin of from 0.015 to 0.021 pounds per square foot, using the above-mentioned feed rate.

Figure 2:
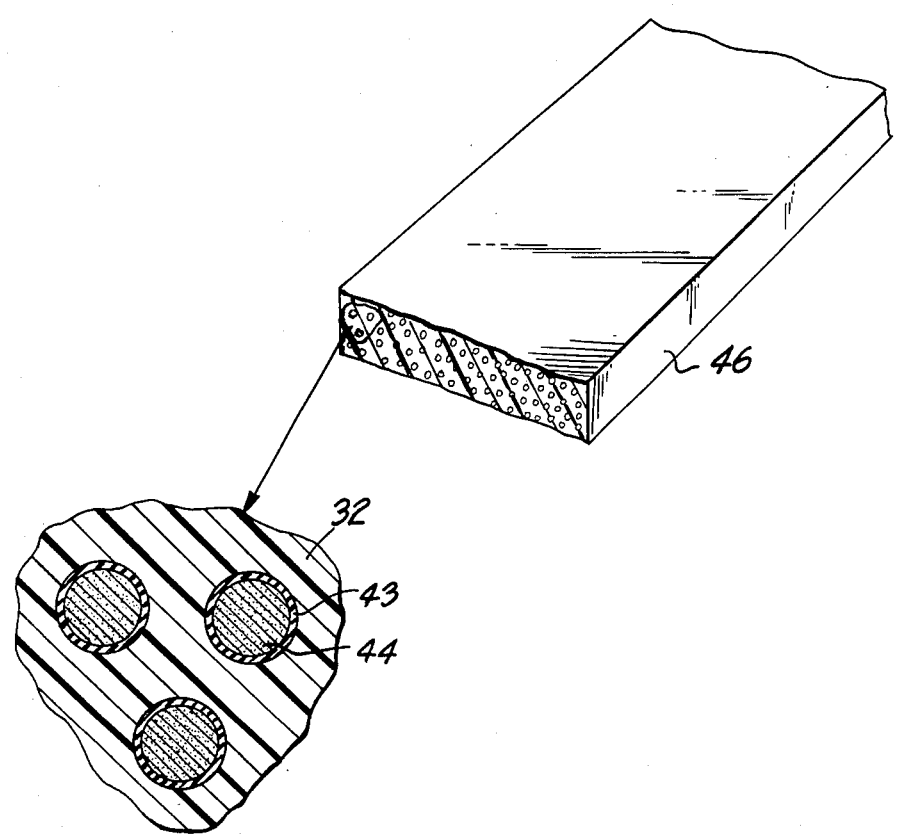
FIG. 2 is an enlarged cross-sectional view of a strip of the fiber-resin matrix prepreg of the invention.

Fiber-resin matrix composite 38 is then delivered to roller 40, where it is wound with release paper 42, to form prepreg tape 46. The resulting composite, as can be seen in FIG. 2, comprises individual fibers 44 coated with the elastomer 43 in the matrix resin 32.

FIG. 1 is for illustration only. The objects of the invention can also be achieved if instead of two matrix films, only one is used, or if instead of using films the matrix resin is continuously applied from a hot-melt coater. Since the elastomer coating is covalently bonded to the fiber and cannot be removed by dissolution, the matrix resin can also be applied using a second impregnation bath consisting of matrix resin dissolved in a suitable solvent. Also, the elastomer coated fiber tape can be stored after drying, and the matrix resin can be applied at a later time using the same or different equipment.

A matrix resin for the present invention, item 32 in FIG. 1, can be made according to the following formulation:

|  | Parts by weight |
| --- | --- |
| Tetra (4,4')N—glycidyl methylene dianiline (Ciba-Geigy's MY-720) | 80 |
| Tetraglycidoxy tetraphenylethane (Shell's Epon 1031) | 20 |
| Trimethylene glycol di-parapaminobenzoate (Polariod's Polacure 740 M) | 44 |
| Fumed silica (SiO₂) (Cabot Corp., Cab-O-sil M-5) | 6 |
| Reaction product of toluene diisocyanate and dimethylamine | 1 |

The invention is further illustrated in the following examples, which are included for instructional purposes and are not intended as a limitation on the scope of the invention.

EXAMPLE 1

On a commercial full scale tape machine, 100 parallel twos of epoxy-sized Celion ® 6K carbon fibers were impregnated continuously in a methylene chloride bath containing 3.5% by weight of Hycar 1472, a rubbery butadiene-acrylonitrile copolymer (ABS) rubber with pendant carboxy groups, and 1.2% by weight of MY720, a tetra-functional epoxy resin. The impregnated tape was continuously dried on a conveyor belt in an oven at 90° C. for 8 minutes. Microscopic examination of the fibers showed them to be uniformly coated. The coating thickness (T) is approximately given by:

$$T = 0.05 \times (\% \text{ Elastomer on the fiber}) \text{ in } \mu m (10^{-6} m)$$

The thickness of the coating is typically less than 1/10 of the fiber diameter and the fiber tape is pervious to the penetrations of the matrix resin which is applied in the next step.

A sample of the coated tape was immersed in methylene chloride and agitated. The elastomer coating could not be dissolved away, and there was no weight change in the elastomer coated tape by washing with methylene chloride, indicating that the coating was bonded to the fibers.

An epoxy resin film was applied to the one side of the impregnated and dried tape continuously, the prepreg thus formed was consolidated by passing through several sets of heated compression rollers and then collected on a spool.

Test panels were prepared by laying up cut out sheets of the prepreg to make 16 ply unidirectional and 36 ply quasi-isotropic laminates and curing them in an autoclave at 350° F. under pressure. Specimens were cut from the panels to test fracture toughness and compressive strength after an impact by a falling weight of 1500 in. lb. per inch of laminate thickness.

The fracture toughness of the material thus produced was measured by the width tapered double cantilever beam test and was found to be 2.78 in.lb./in.$^2$. The compressive strength of the material after it was impacted as described was 40.3 ksi (1 ksi = 1000 psi).

EXAMPLE 2

Example 1 was repeated, except that the elastomer-coated carbon fiber tape was sandwiched between two epoxy resin films, instead of one, and consolidated as above. The laminate had 43.5 ksi compressive strength after impact damage. Thus the method of resin matrix application did not change the result significantly.

EXAMPLE 3

Example 1 was again repeated, but with an ABS rubber having no reactivity with the epoxy resin and using no epoxy resins in the impregnation bath. On washing the coated and dried fibers with methylene chloride, all of the rubber was removed from the tape. Thus this rubber, having no reactive groups that can react with epoxy resin, could not form covalent bonds.

The fracture toughness of the test panels made from this material was 1.06. in.lb./in.$^2$ and the compressive strength after impact damage was 28.4 ksi. Thus, the properties deteriorated when a non-reactive elastomer was used.

EXAMPLE 4

Example 1 was repeated without any elastomer of any kind in the impregnation bath, but with 1.2% by weight of epoxy resin present. The dried carbon fiber tape disintigrated on washing with methylene chloride and all of the resin was removed. A prepreg formed the same way as in Example 1 had a fracture toughness of 0.90 in.lb./in.$^2$, and a compressive strength of 31.1 ksi after 1500 in.lb./in. of impact. Thus, properties were deficient when an elastomer layer was absent.

EXAMPLE 5

The procedure of Example 4 was repeated, but instead of one, two epoxy films were used to make the prepreg (as in Example 2). The laminate from this prepreg had a fracture toughness of 1.20 in.lb./in.$^2$, and a compressive stength of 29.0 ksi after 1500 in.lb./in. of impact damage. Thus, the method of resin matrix application did not change the results significantly.

EXAMPLE 6

In this example, the impregnation bath was eliminated altogether and the prepregs were formed as in Example 2 using two epoxy resin films. Laminate properties were 1.65 in.lb./in.$^2$ fracture toughness, and 30.8 ksi compressive strength after 1500 in.lb./in. impact damage. Thus, the absence of an impregnation bath, as is the current industrial practice, and use of the fiber producer's size on the fiber alone did not result in improved properties.

EXAMPLE 7

Figure 3:
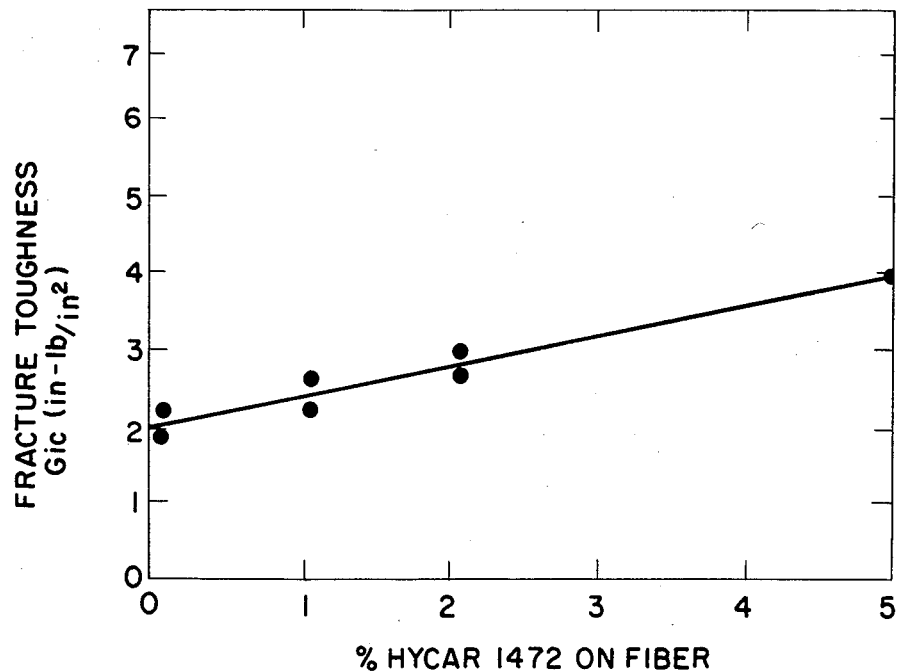
FIG. 3 is a graph of fracture toughess versus increasing amount of coating for coated fibers in accordance with the invention.

In a laboratory apparatus, single carbon tows were continuously impregnated with a solution of Hycar 1472 rubber and MY720 epoxy resin of various concentrations to arrive at elastomer concentrations of 1, 2 and 5% on the fiber. The impregnated tows were laid parallel to each other by a winding apparatus and coated with epoxy resin. Sixteen-ply unidirectional composites were produced and tested for fracture toughness and interlaminar shear strength. The fracture toughness of the coated fibers increases with increasing amount of coating as shown in FIG. 3.

Figure 4:
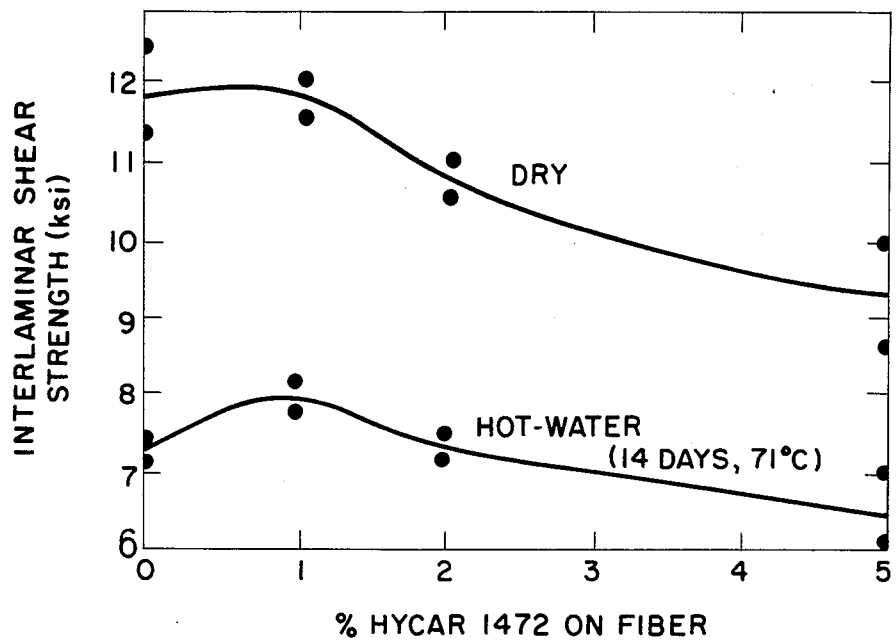
FIG. 4 is a graph of interlaminar shear strength versus fiber coating amount as between composites tested under dry and those tested under hot-wet conditions.

Epoxy matrices are sensitive to hot-wet conditions and their strength is reduced when tested in hot water as shown in FIG. 4. The elastomer coated and bare fibers show the same amount of strength reduction, indicating that the presence of elastomer as a distinct layer incurs no additional penalty, such as is observed with elastomer modified or plasticized epoxy matrices.

Many variations of this invention will probably suggest themselves to those skilled in the art in view of the above description. For example, virtually any type of reinforcing filament can be used, including silicon carbide, boron, aramid, polyester, polyamide, rayon, as well as metal-coated versions thereof. The fibers can also be introduced to the coating bath as single or multiple tows or rovings for filament winding and as fabrics. The epoxy resin (matrix material) and the coating material may be varied from the preferred embodiments. Other fillers, besides or in addition to fumed silica, can be employed in the composites. It should be understood, therefore, that changes may be made in the particular embodiments shown without departing from the scope of the invention defined by the appended claims.

I claim:

1. A fiber-resin matrix composition, comprised of:
   (a) reinforcing fibers precoated with a fiber- and matrix resin-reactive elastomeric material that resists movement away from the fiber surface, forming a covalently bonded bridging layer between the fibers and the matrix resin; and
   (b) a heat-curable resin composition comprising:
      (i) an epoxy prepolymer or combination of epoxy prepolymers having more than one epoxide group per molecule, and
      (ii) an effective amount of an amine curing agent selected from those of the formula

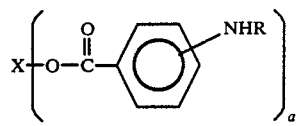

wherein a is 2 or 3, R is hydrogen, alkyl or aryl and X is a divalent or trivalent organic hydrocarbon, hetero-interrupted hydrocarbon, or substituted hydrocarbon radical.

2. A composition according to claim 1, in which the reinforcing fibers, component (a), comprise carbon, graphite, silicon carbide, boron, rayon, polybenzimidazole, polyester, polyamide, polyaramid, metal-coated fibers of any of the foregoing, or combinations of any of the foregoing.

3. A composition according to claim 1, in which the elastomeric material of component (a) is a rubbery vinyl addition polymer.

4. A composition according to claim 1, in which the elastomeric material of component (a) is a homopolymer or copolymeric diene rubber.

5. A composition according to claim 4, in which the diene rubber is derived from a conjugated diene of from 4 to 8 carbon atoms.

6. A composition according to claim 5, in which the diene rubber is selected from the group consisting of butadiene, isoprene, propylene and chloroprene.

7. A composition according to claim 6, in which the diene rubber is a carboxylic-functional butadiene-acrylonitrile copolymer.

8. A composition according to claim 7, in which the copolymer is characterized by 6 to 8 percent by weight of carboxylation.

9. A composition according to claim 1, in which the reinforcing fibers of component (a) are made of graphite, carbon, polyaramid or nickel-plated graphite.

10. A composition according to claim 1, in which the epoxy prepolymer, component (b)(i), is a cycloaliphatic polyfunctional epoxide.

11. A composition according to claim 1, in which the epoxy prepolymer, component (b)(i), is selected from aromatic compounds having the formula:

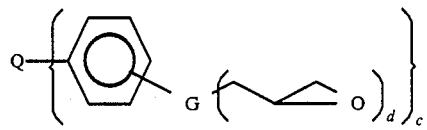

and halogen and alkyl substituted derivatives of such compounds, wherein c is 2, 3 or 4 and equal to the valence of Q, Q is a divalent, trivalent or tetravalent radical; G is —O—, —NR'— or —N—; R' is hydrogen or alkyl; and d is 1 or 2 and equal to the valence of G.

12. A composition according to claim 11, in which the epoxy prepolymer, component (b)(i), comprises a compound having the formula:

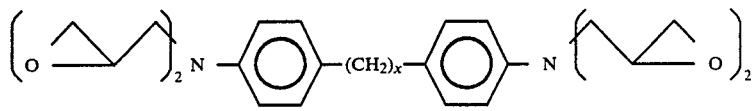

wherein x is an integer of from 1 to 4.

13. A composition according to claim 12, wherein x is 1.

14. A composition according to claim 11, in which the epoxy prepolymer, component (b)(i), comprises a compound having the formula:

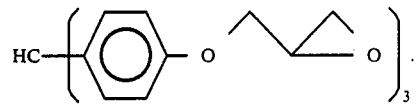

15. A composition according to claim 11, in which the epoxy prepolymer, component (b)(i), comprises a compound having the formula:

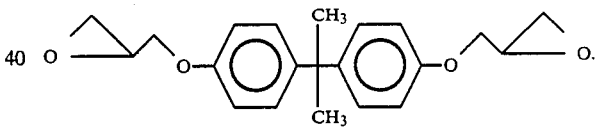

16. A composition according to claim 11, in which the epoxy prepolymer, component (b)(i), comprises a compound having the formula:

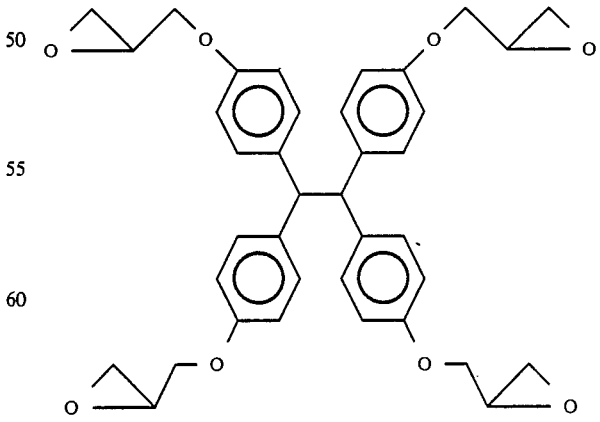

17. A composition according to claim 11, in which the epoxy prepolymer, component (b)(i), is a compound having a formula:

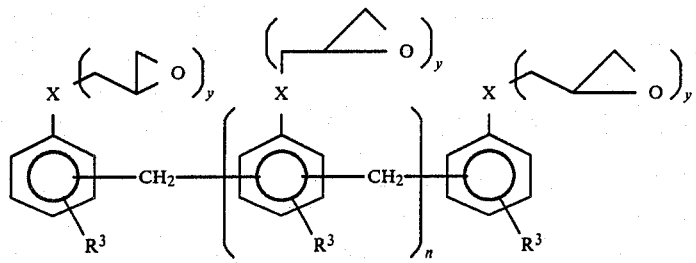

wherein y is 1 or 2, x is —O— or —N—, $R^3$ is H or $CH_3$ and n is 2 to 8, or a mixture of the foregoing.

18. A composition according to claim 11, in which the epoxy prepolymer, component (b)(i), comprises a compound having the formula:

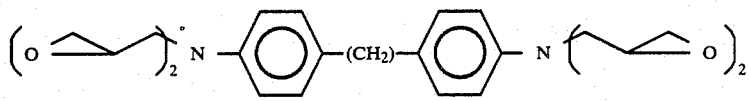

in combination with a compound having the formula

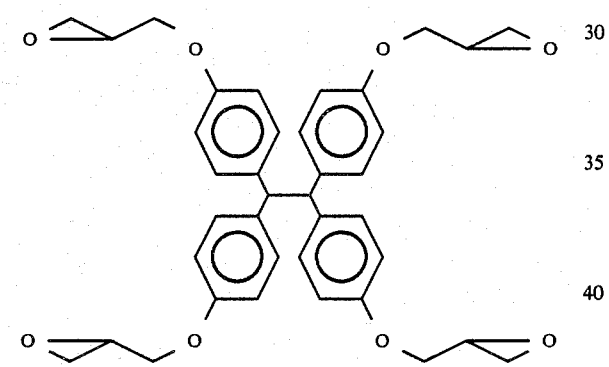

19. A composition according to claim 11, in which the epoxy prepolymer, component (b)(i), comprises a compound having the formula:

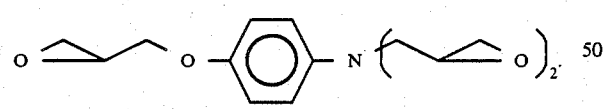

20. A composition according to claim 1, in which the curing agent is used together with a second aromatic polyfunctional amine curing agent.

21. A composition according to claim 1, in which in the curing agent, component (b)(ii), R is hydrogen or $C_1$-$C_3$ alkyl, X is a divalent or trivalent radical having a valence of a selected from (1) a divalent group consisting of —$(CH_2)y$—, wherein y is an integer of from 2 to 6; —$(CH_2CH_2OCH_2CH_2OCH_2CH_2)$—;

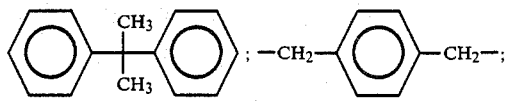

-continued

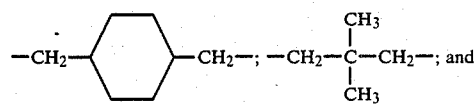

(2) a trivalent group consisting of —N— and —$(CH_2)n$—CH—$(CH_2)m$—, wherein n and m are the same or different integers from 1 to 4.

22. A composition according to claim 1, in which the curing agent, component (b)(ii), is selected from compounds of the formulae:

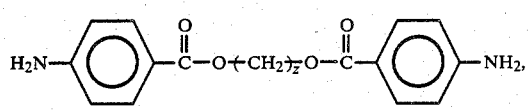

wherein z is an integer of from 2 to 12;

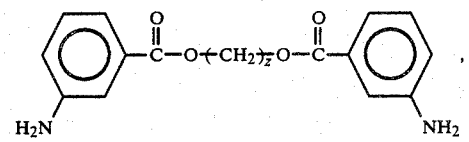

wherein z is an integer of from 2 to 12;

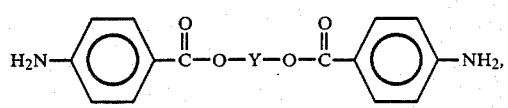

wherein Y is —$CH_2CH_2OCH_2CH_2OCH_2CH_2$—,

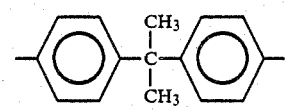

-continued

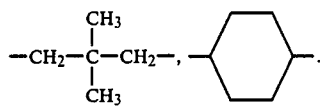

23. A composition according to claim 22, in which the curing agent, component (b)(ii), comprises a compound of the formula

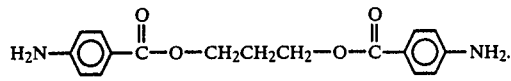

24. A composition according to claim 23, which additionally includes a compound of the formula

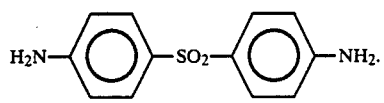

25. A composition according to claim 1, which additionally includes (b)(iii), an effective amount of a curing catalyst.

26. A composition according to claim 25, in which the curing catalyst, component (b)(iii), comprises a reaction product of toluenediisocyanate and dimethylamine.

27. A composition according to claim 25, in which the curing catalyst, component (b)(iii), comprises the reaction product of boron trifluoride and an amine.

28. A composition according to claim 25, which additionally contains (c) a filler.

29. A composition according to claim 28, in which the filler is fumed silica.

30. A heat-curable fiber-epoxy resin matrix composition, comprising:
    (a) a fibrous reinforcement precoated with a fiber- and epoxy resin-reactive elastomeric material consisting essentially of a carboxylated acrylonitrile-butadiene rubber;
    (b) a heat-curable epoxy resin composition comprising
        (i) an epoxy prepolymer or combination of prepolymers having not less than four epoxide groups per molecule,
        (ii) an effective amount of an amine-functional curing agent or combination of curing agents selected from those of the formula

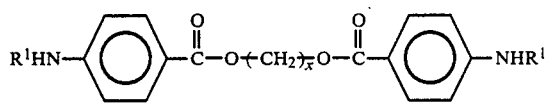

wherein $R^1$ is hydrogen, and $z$ is an integer of from 2 to 12, and
        (iii) a small, effective amount of a curing catalysts; and
    (c) a fumed silica filler.

31. A reinforced fiber-resin matrix composite comprising a fiber-resin matrix composition according to claim 1.

32. A reinforced fiber-resin matrix composite comprising a fiber-resin matrix composition according to claim 30.

* * * * *